(No Model.) 2 Sheets—Sheet 2.
M. J. STEFFENS.
AERIAL PHOTOGRAPHIC APPARATUS.
No. 359,902. Patented Mar. 22, 1887.
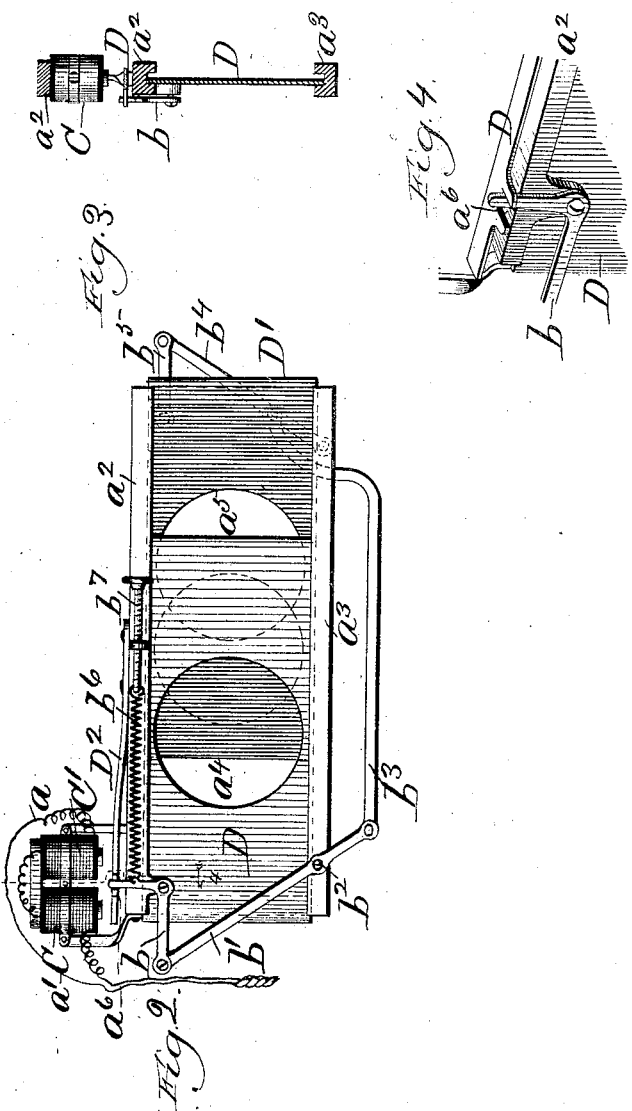

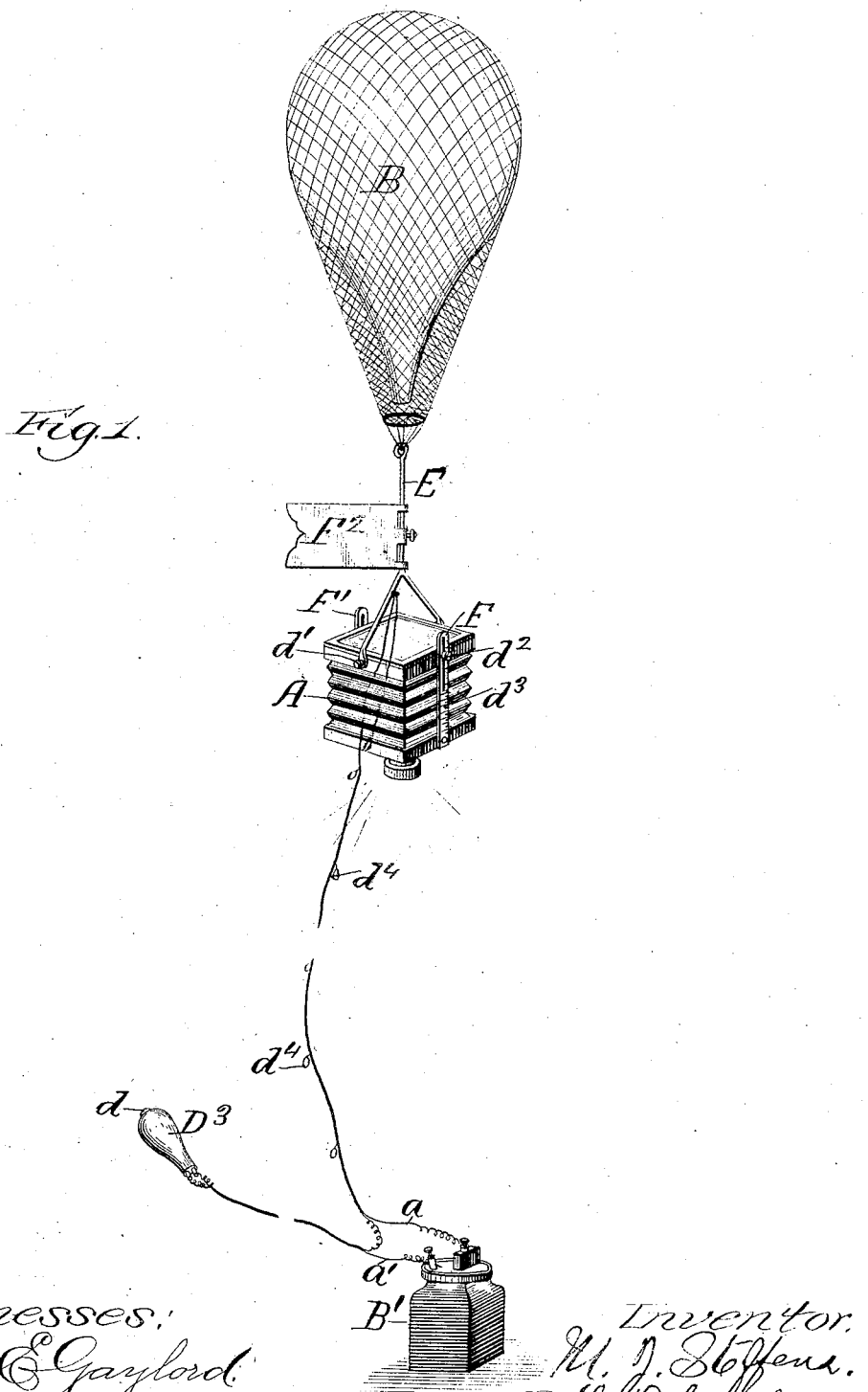

UNITED STATES PATENT OFFICE.

MATHEW JOSEPH STEFFENS, OF CHICAGO, ILLINOIS.

AERIAL PHOTOGRAPHIC APPARATUS.

SPECIFICATION forming part of Letters Patent No. 359,902, dated March 22, 1887.

Application filed February 23, 1886. Serial No. 192,803. (No model.)

*To all whom it may concern:*

Be it known that I, MATHEW JOSEPH STEFFENS, of Chicago, county of Cook, and State of Illinois, have invented certain new and useful Improvements in Aerial Photographic Apparatus, of which the following is a full, clear, and exact description, that will enable others to make and use the same, reference being had to the accompanying drawings, forming a part of this specification.

The object of this invention is to provide an apparatus for taking bird's-eye views or instantaneous photographic pictures of natural scenery, landscapes, cities, towns, and objects of interest.

The invention consists of constructions and combinations, all as will hereinafter be described in the specification, and pointed out in the claims.

Figure 1 is an elevation embodying my improved features. Fig. 2 is an interior view of the camera, showing the electric connection for operating the slides. Fig. 3 is a sectional detail in the plane 4, Fig. 2; and Fig. 4 is a detached detail.

Referring to the drawings, A represents a camera suspended in the air by means of the balloon B, and B' an electric battery located on the ground and having suitable connection with the camera through the medium of the insulated electric wires $a$ $a'$.

C C' are two spool-magnets having proper arrangement and connection with the camera, (see Fig. 2,) the electric wires $a$ $a'$, leading from the battery on the ground, being attached thereto. The function of this electric connection is to impart an instantaneous action or movement to the slides or shutters controlling the exposure of the photographic plate. The photographic slides or shutters D D' are arranged to have a longitudinal movement in the grooved framing-bars $a^2$ $a^3$, (see Fig. 3,) and are adapted to have a simultaneous endwise movement with relation to each other. These slides or shutters are provided with circular openings $a^4$ $a^5$, which, when brought opposite each other, give the desired momentary exposure necessary to secure the picture. The slides are connected by means of a system of levers, which will now be described. $b$ is a bell-crank lever pivoted to the slide D, as illustrated in Fig. 2.

The upper end of this bell-crank lever is adapted to engage loosely with the notch $a^6$ in the armature D², the opposite end being pivoted to the upper end of the lever $b'$. The lower part of the lever $b'$ is provided with the fulcrum-bearing $b^2$, and the extreme end pivoted to one end of the connection-lever $b^3$. The opposite end of the lever $b^3$ is curved inward and pivoted to the lever $b^4$ at some distance from the lower end, as shown in Fig. 2. The extreme lower end of the lever $b^4$ is pivoted to the frame-work, while the upper end is pivoted to the outer end of the link $b^5$, the inner end of which is in turn pivoted to the companion slide, D'. By this means the motion applied to slide D is simultaneously transmitted to the companion slide, D'.

One end of the retracting-spring $b^6$ is secured to the bell-crank lever $b$ and the opposite end to the tension-adjusting screw $b^7$. This spring serves the purpose of automatically returning the slides to a normal position when the bell-crank is released from engagement with the armature. The slides are shown in the position they are set preparatory to sending up the camera, the electric circuit being open. When the camera has reached the desired position, the circuit is closed by means of the push-button $d$ in the handle D³, and the armature attracted so as to be disengaged from the bell-crank lever, and the slides returned to a normal position, as above described, the photographic plate being for an instant exposed as the openings in the slides come opposite when in the act of passing each other.

The camera is suspended from the balloon by means of the rod E, the lower end of which is bifurcated and adjustably secured to opposite sides of the camera by thumb-screws $d'$, as shown in Fig. 1. By this arrangement the camera is adapted to swing between the yoke ends of the rod E, so as to bring the lens-tube to bear at any desired angle, the thumb-screws holding the camera in any position to which it may be adjusted.

The slotted guides F F' are secured to opposite sides of the camera, and serve the purpose of enabling the operator to bring the camera to the desired focus, the thumb-screws $d^2$ securing the parts at the position of adjustment. These guides have graduations $d^3$, so that when the right focus is once ascertained for a certain distance a permanent record may be made by means of said graduations. The insulated electric wires connecting the camera and the battery will be provided at intervals with tags $d^4$, or other suitable marks, whereby the exact height and distance may be made to coincide in bringing the camera to the right focus. These wires also serve as a cord for controlling the balloon.

The wind-vane $F^2$ is adjustably secured to the rod E, and may be set so as to cause the lens-tube to point in any desired direction, no matter from what direction the wind may be blowing.

Having thus described my invention, what I claim, and desire to secure by Letters Patent, is—

1. In a photographing apparatus, the combination, with the slides D D', of the bell-crank lever $b$, the lever $b'$, the connection-lever $b^3$, the lever $b^4$, the link $b^5$, and the spring $b^6$, whereby said slides are returned to a normal position when released from the armature $D^2$, substantially as and for the purpose set forth.

2. The combination, with the camera A and the balloon B, of the rod E, having the lower end bifurcated and adjustably secured to said camera, whereby the latter may be adjusted to bring the lens-tube to bear at any desired angle, substantially as and for the purpose set forth.

3. In a photographic apparatus of the character hereinbefore described, the combination, with a camera, of the slotted graduated guides F F' and the tagged insulated wires or cord connecting the camera with the earth, substantially as and for the purpose set forth.

4. The combination, with the camera A, of the balloon B, the rod E, and the weather-vane F, substantially as and for the purpose set forth.

MATHEW JOSEPH STEFFENS.

Witnesses:
M. C. JOSLYN,
V. STANWOOD.